(12) United States Patent
Li

(10) Patent No.: US 10,472,275 B2
(45) Date of Patent: Nov. 12, 2019

(54) METHOD OF ADHERING SILICONE RUBBER FILM AND GLASS SHEET TOGETHER

(71) Applicant: Feng Li, Guangdong (CN)

(72) Inventor: Feng Li, Guangdong (CN)

( * ) Notice: Subject to any disclaimer, the term of this patent is extended or adjusted under 35 U.S.C. 154(b) by 0 days.

(21) Appl. No.: 15/310,786

(22) PCT Filed: Sep. 14, 2015

(86) PCT No.: PCT/CN2015/089505
§ 371 (c)(1),
(2) Date: Nov. 14, 2016

(87) PCT Pub. No.: WO2017/041309
PCT Pub. Date: Mar. 16, 2017

(65) Prior Publication Data
US 2018/0170802 A1 Jun. 21, 2018

(30) Foreign Application Priority Data
Sep. 9, 2015 (CN) .......................... 2015 1 0570623

(51) Int. Cl.
| | |
|---|---|
| *B29C 39/10* | (2006.01) |
| *C03C 17/30* | (2006.01) |
| *B29C 39/26* | (2006.01) |
| *B29C 39/36* | (2006.01) |
| *B29C 39/38* | (2006.01) |
| *B29C 41/50* | (2006.01) |
| *B29K 19/00* | (2006.01) |

(52) U.S. Cl.
CPC .............. *C03C 17/30* (2013.01); *B29C 39/10* (2013.01); *B29C 39/26* (2013.01); *B29C 39/36* (2013.01); *B29C 39/38* (2013.01); *B29C 41/50* (2013.01); *B29K 2019/00* (2013.01)

(58) Field of Classification Search
CPC ......... C03C 17/30; B29C 39/10; B29C 39/26; B29C 39/36; B29C 39/38; B29C 41/50
See application file for complete search history.

(56) References Cited

U.S. PATENT DOCUMENTS

| | | | |
|---|---|---|---|
| 4,822,680 A * | 4/1989 | Catalano | ............. B29C 35/0227 428/425.6 |
| 6,449,916 B1 * | 9/2002 | Waters | .................. B44C 5/0407 156/63 |
| 8,277,945 B2 * | 10/2012 | Anderson | ......... B32B 17/10174 428/337 |
| 2003/0016427 A1 * | 1/2003 | Arnold | .................... B29C 39/02 359/831 |

* cited by examiner

*Primary Examiner* — Joseph S Del Sole
*Assistant Examiner* — John Robitaille

(57) ABSTRACT

A method of adhering a silicone rubber film and a glass sheet together contains steps of: (A). Pouring liquid silicone rubber into a mold in a vacuum condition so as to form a silicone rubber film with 0.2 mm thickness after the liquid silicone rubber solidifies; (B). Placing a glass sheet into the mold and pressing the glass sheet on the silicone rubber film in the mold by way of a press plate; (C). Baking the silicone rubber film in a temperature of 80° C. to 150° C. for 20 minutes to 30 minutes; and (D). Removing the glass sheet and the silicone rubber film from the mold. Thereby, the silicone rubber film does not attach on the inner wall of the mold as being removed from the mold.

7 Claims, 1 Drawing Sheet

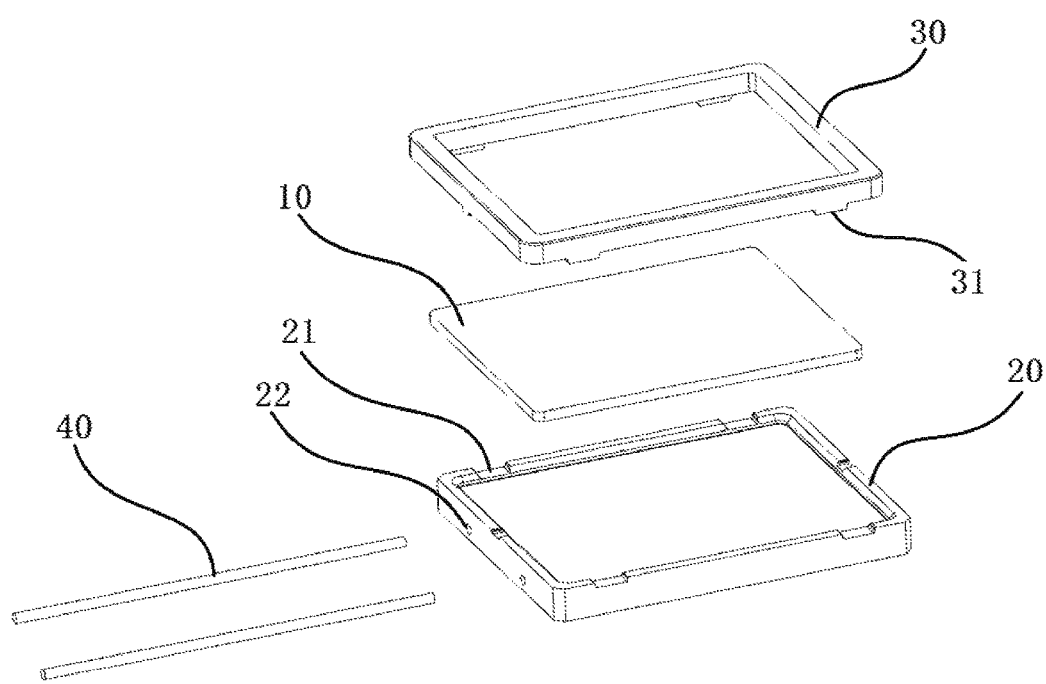

METHOD OF ADHERING SILICONE RUBBER FILM AND GLASS SHEET TOGETHER

FIELD OF THE INVENTION

The present invention relates to a method of adhering a silicone rubber film and a glass sheet together which obtains the silicone rubber film not attaching on the inner wall of the mold as being removed from the mold.

BACKGROUND OF THE INVENTION

A translucent substrate of a LED lamp is made of sapphire, PVC, or glass material. The translucent substrate contains a glass sheet and a silicone rubber film adhering on the glass sheet.

The silicone rubber film is made by a mold and is adhered on the glass sheet by glue, however, a slit forms between the glass sheet and the silicone rubber film, hence photon cannot fully transmit through the glass sheet and the silicone rubber film. In addition, the glass sheet and the silicone rubber film cannot adhere durably.

To adhere the glass sheet and the silicone rubber film securely, the silicone rubber is injection molded with the glass sheet by using an injection mold which includes a molding portion, a pouring system, a guiding mechanism, an ejection mechanism, a cooling system, and a heating system. Therefore, the glass sheet and the silicone rubber film are adhered together at high production cost. Furthermore, a part of the silicone rubber film adheres on an inner wall of the injection mold easily as being removed from the injection mold.

The present invention has arisen to mitigate and/or obviate the afore-described disadvantages.

SUMMARY OF THE INVENTION

The primary objective of the present invention is to provide a method of adhering a silicone rubber film and a glass sheet together which obtains the silicone rubber film not attaching on the inner wall of the mold as being removed from the mold.

To obtain above-mentioned objective, a method of adhering a silicone rubber film and a glass sheet together provided by the present invention contains steps of:

(A). Pouring liquid silicone rubber into a mold in a vacuum condition so as to form a silicone rubber film with 0.2 mm thickness after the liquid silicone rubber solidifies;

(B). Placing a glass sheet into the mold and pressing the glass sheet on the silicone rubber film in the mold by way of a press plate;

(C). Baking the silicone rubber film in a temperature of 80° C. to 150° C. for 20 minutes to 30 minutes; and (D). Removing the glass sheet and the silicone rubber film from the mold.

Preferably, the mold has an open accommodation chamber defined on a top thereof, and a profile of the open accommodation chamber corresponds to that of the glass sheet.

Preferably, the mold also has multiple locking recesses arranged on a peripheral side of the top thereof, and the press plate has multiple fixing posts extending downwardly from a peripheral side of a bottom thereof and corresponding to the multiple locking recesses, respectively.

Preferably, the mold has a heating portion configured to accommodate a heater so as to heat the liquid silicone rubber in the mold by using the heater.

Preferably, the mold has at least one heating orifice configured to accommodate the at least one heating column, individually.

Preferably, an anti-sticking coating layer is sprayed on an inner wall of the mold (20).

Preferably, the anti-sticking coating layer is Teflon coating layer of 0.01 mm to 0.02 mm.

BRIEF DESCRIPTION OF THE DRAWINGS

FIG. 1 is a perspective view showing the exploded components of equipment used to achieve a method of adhering a silicone rubber film and a glass sheet together according to a first embodiment of the present invention.

DETAILED DESCRIPTION OF THE PREFERRED EMBODIMENTS

With reference to FIG. 1, a method of adhering a silicone rubber film and a glass sheet together according to a preferred embodiment of the present invention is achieved by using a mold 20, a press plate 30, at least one heating column 40, and a glass sheet 10 located between the mold 20 and the press plate 30.

The method of adhering the silicone rubber film and the glass sheet together comprises steps of:

Pouring liquid silicone rubber into the mold 20 in a vacuum condition so as to form a silicone rubber film with 0.2 mm thickness after the liquid silicone rubber solidifies;

Drawing and placing the glass sheet 10 into the mold 20 by using an automatic picking conveyor so that the glass sheet 10 covers on the silicone rubber film in the mold 20;

Pressing the glass sheet 10 in the mold 20 by using the press plate 30;

Baking the silicone rubber film in a temperature of 80° C. to 150° C. for 20 minutes to 30 minutes, wherein when the silicone rubber film is manufactured by Dow Corning, the silicone rubber film is baked in a temperature of 80° C. to 100° C. for 20 minutes to 30 minutes, and when the silicone rubber film is manufactured by Shin-Etsu Silicone Co. Inc., the silicone rubber film is baked in a temperature of 150° C. for 20 minutes to 30 minutes;

Removing the press plate 30, the glass sheet 10, and the silicone rubber film from the mold 20;

Removing the press plate 30 from the glass sheet 10 so as to obtain the glass sheet 10 on which the silicone rubber film adheres.

The mold 20 has an open accommodation chamber defined on a top thereof, and a profile of the open accommodation chamber corresponds to that of the glass sheet 10.

The mold 20 also has multiple locking recesses 21 arranged on a peripheral side of the top thereof, and the press plate 30 has multiple fixing posts 31 extending downwardly from a peripheral side of a bottom thereof and corresponding to the multiple locking recesses 21, respectively. When the press plate 30 presses the glass sheet 10 in the mold 20, the multiple fixing posts 31 retain in the multiple locking recesses 21, respectively, and a distance between the glass sheet 10 and a bottom of the open accommodation chamber of the mold 20 is 0.2 mm.

The mold 20 has a heating portion configured to accommodate a heater so as to heat the liquid silicone rubber in the mold 20 by using the heater, wherein the mold 20 has at least one heating orifice 22 configured to accommodate the at least one heating column 40, individually.

Preferably, an anti-sticking coating layer is sprayed on an inner wall of the mold 20.

Preferably, the anti-sticking coating layer is Teflon coating layer of 0.01 mm to 0.02 mm so as to achieve heat resistance, anti-stickiness, durability, electric insulation, corrosion resistance, and flame retardance, hence the silicone rubber film does not attach on the inner wall of the mold as being removed from the mold 20.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of adhering a silicone rubber film and a glass sheet together comprising steps of:
   (A). Pouring liquid silicone rubber into a mold in a vacuum condition so as to form a silicone rubber film with 0.2 mm thickness after the liquid silicone rubber solidifies;
   (B). Placing a glass sheet into the mold and pressing the glass sheet on the silicone rubber film in the mold by way of a press plate;
   (C). Baking the silicone rubber film in a temperature of 80° C. to 150° C. for 20 minutes to 30 minutes; and
   (D). Removing the glass sheet and the silicone rubber film from the mold.

2. The method as claimed in claim 1, wherein the mold has an open accommodation chamber defined on a top thereof, and a profile of the open accommodation chamber corresponds to that of the glass sheet.

3. The method as claimed in claim 2, wherein the mold also has multiple locking recesses arranged on a peripheral side of the top thereof, and the press plate has multiple fixing posts extending downwardly from a peripheral side of a bottom thereof and corresponding to the multiple locking recesses, respectively.

4. The method as claimed in claim 3, wherein the mold has a heating portion configured to accommodate a heater so as to heat the liquid silicone rubber in the mold by using the heater.

5. The method as claimed in claim 4, wherein the mold has at least one heating orifice configured to accommodate the at least one heating column, individually.

6. The method as claimed in claim 1, wherein an anti-sticking coating layer is sprayed on an inner wall of the mold.

7. The method as claimed in claim 6, wherein the anti-sticking coating layer is Teflon coating layer of 0.01 mm to 0.02 mm.

\* \* \* \* \*